(12) United States Patent
     Shiga (10) Patent No.: US 8,851,247 B2
(45) Date of Patent: * Oct. 7, 2014

(54) DAMPER, WASHING MACHINE AND WASHING/DRYING MACHINE

(71) Applicant: Kabushiki Kaisha Toshiba, Tokyo (JP)

(72) Inventor: Tsuyoshi Shiga, Tokyo (JP)

(73) Assignees: Kabushiki Kaisha Toshiba, Tokyo (JP); Toshiba Consumer Electronics Holdings Corporation, Tokyo (JP); Toshiba Home Appliances Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,566

(22) Filed: Nov. 20, 2012

(65) Prior Publication Data

US 2013/0081433 A1     Apr. 4, 2013

Related U.S. Application Data

(63) Continuation of application No. PCT/JP2011/050539, filed on Jan. 14, 2011.

(30) Foreign Application Priority Data

May 21, 2010   (JP) ................................ 2010-117311

(51) Int. Cl.
    *F16F 9/53*      (2006.01)
    *D06F 37/20*    (2006.01)
    *D06F 33/02*    (2006.01)
    *D06F 37/22*    (2006.01)

(52) U.S. Cl.
    CPC ................. *F16F 9/535* (2013.01); *D06F 33/02* (2013.01); *D06F 37/20* (2013.01); *D06F 37/22* (2013.01)

USPC ......... 188/267.2; 188/267; 68/23.1; 68/12.06

(58) Field of Classification Search
    CPC ......... D06F 37/20; D06F 33/02; D06F 37/22; F16F 9/535
    USPC ............. 68/23.1–23.3, 12.02; 188/267–267.2
    See application file for complete search history.

(56) References Cited

U.S. PATENT DOCUMENTS

| 5,284,330 A | 2/1994 | Carlson |
| 5,398,917 A | 3/1995 | Carlson |

(Continued)

FOREIGN PATENT DOCUMENTS

| CN | 101709761 | 5/2010 |
| EP | 2072653   | 6/2009 |

(Continued)

OTHER PUBLICATIONS

Machine translation of JP 200657766 A.*

(Continued)

*Primary Examiner* — Joseph L Perrin
*Assistant Examiner* — Kevin G Lee
(74) *Attorney, Agent, or Firm* — DLA Piper LLP (US)

(57) ABSTRACT

A damper includes a bobbin which is housed in a cylinder and on which a coil is wound and yokes housed in the cylinder. At least one of the yokes is disposed at a first axial side of the bobbin, and at least one other of the yokes is disposed at a second axial side of the bobbin. A magnetic viscous fluid is retained on inner surfaces of the yokes and an inner surface of the bobbin. Sealing members are configured to prevent leakage of the magnetic viscous fluid. A shaft extends through the yokes, the bobbin and the sealing members and is configured to be axially reciprocable relative to the yokes, the bobbin and the sealing members such that reciprocation of the shaft does not substantially displace the magnetic viscous fluid. The coil, the bobbin and the yokes are fixed together by a resin.

20 Claims, 8 Drawing Sheets

(56) References Cited

U.S. PATENT DOCUMENTS

| | | | |
|---|---|---|---|
| 5,492,312 | A | 2/1996 | Carlson |
| 6,151,930 | A | 11/2000 | Carlson |
| 6,202,806 | B1 | 3/2001 | Sandrin |
| 6,340,080 | B1 | 1/2002 | Carlson |
| 6,390,253 | B1 | 5/2002 | Oliver |
| 6,394,239 | B1 | 5/2002 | Carlson |
| 6,471,018 | B1 | 10/2002 | Gordaninejad |
| 6,497,309 | B1 | 12/2002 | Lisenker |
| 6,823,971 | B2 | 11/2004 | Takeda |
| 6,883,649 | B2 | 4/2005 | Lun |
| 7,219,781 | B2 | 5/2007 | Akami |
| 8,387,420 | B2 | 3/2013 | Kawabata |
| 2002/0130002 | A1 | 9/2002 | Hopkins |
| 2002/0185347 | A1 | 12/2002 | Pohl |
| 2003/0233854 | A1* | 12/2003 | Matsuda et al. .......... 68/16 |
| 2004/0262106 | A1 | 12/2004 | Manecke |
| 2005/0211517 | A1 | 9/2005 | Carlson |
| 2008/0007012 | A1 | 1/2008 | Jeong |
| 2009/0050425 | A1 | 2/2009 | Murakami |

FOREIGN PATENT DOCUMENTS

| | | |
|---|---|---|
| JP | 63-125243 | 8/1988 |
| JP | 8-19687 | 1/1996 |
| JP | 8-21482 | 1/1996 |
| JP | 10-214715 | 8/1998 |
| JP | 2002-502942 | 1/2002 |
| JP | 2005-502850 | 1/2005 |
| JP | 2006-029585 | 2/2006 |
| JP | 2006-57766 | 3/2006 |
| JP | 2006-230591 | 9/2006 |
| JP | 2007-115835 | 5/2007 |
| JP | 2008-20065 | 1/2008 |
| JP | 2008-208885 | 9/2008 |
| JP | 2008-295906 | 12/2008 |
| JP | 2009-095532 | 5/2009 |
| WO | WO 99/22162 | 5/1999 |
| WO | WO 2010/092886 | 2/2010 |

OTHER PUBLICATIONS

Machine translation of JP 2007115835 A.*
International Search Report in PCT/JP2010/072240 issued Mar. 8, 2011.
Japanese Office Action issued in JP 2010-186109 mailed May 8, 2012.
English Language Translation of Japanese Office Action issued in JP 2010-186109 mailed May 8, 2012.
English Language Abstract of JP 08-021482 published Jan. 23, 1996.
English Language Translation of JP 08-021482 published Jan. 23, 1996.
English Language Abstract of JP 2006-057766 published Mar. 2, 2006.
English Language Translation of JP 2006-057766 published Mar. 2, 2006.
English Language Abstract of JP 2007-115835 published on May 10, 2007.
English Language Translation of JP 2007-115835 published on May 10, 2007.
English Language Abstract of JP 2008-020065 published Jan. 31, 2008.
English Language Translation of JP 2008-020065 published Jan. 31, 2008.
English Language Abstract of JP 2008-295906 published Dec. 11, 2008.
English Language Translation of JP 2008-295906 published Dec. 11, 2008.
English Language Abstract of JP 2002-502942 published Jan. 29, 2002.
English Language Translation of JP 2002-502942 published Jan. 29, 2002.
English Language Abstract of JP 8-019687 published Jan. 23, 1996.
English Language Translation of JP 8-019687 published Jan. 23, 1996.
International Search Report issued in PCT/JP2010/072241 on Apr. 5, 2011.
English Language Abstract of JP 2009-095532 published May 7, 2009.
English Language Translation of JP 2009-095532 published May 7, 2009.
International Search Report issued in PCT/JP2011/050539 on Mar. 8, 2011.
English Language Abstract of JP 2005-502850 published Jan. 27, 2005.
English Language Translation of JP 2005-502850 published Jan. 27, 2005.
English Language Abstract of JP 63-125243 published Aug. 16, 1988.
U.S. Appl. No. 13/593,206 electronically captured on Mar. 19, 2013.
U.S. Appl. No. 13/660,696 electronically captured on Mar. 19, 2013.
U.S. Appl. No. 13/593,206 electronically captured on Oct. 4, 2013.
English Language Abstract of CN 101709761 published May 19, 2010.
English Language Translation of JP 10-214715 published Aug. 11, 1998.
English Language Abstract of JP 10-214715 published Aug. 11, 1998.
English Language Abstract of JP 2008-208885 published Sep. 11, 2008.
English Language Translation of JP 2008-208885 published Sep. 11, 2008.
Japanese Office Action issued in JP 2010-038631 dated May 21, 2013.
English Language Translation of Japanese Office Action issued in JP 2010-038631 dated May 21, 2013.
Extended European Search Report issued in EP 10846640.0 on Jul. 3, 2013.
Extended European Search Report issued in EP 10850762.5 on Sep. 20, 2013.
Korean Office Action issued in KR10-2012-7016693 issued on Sep. 24, 2013.
English Language Translation of Korean Office Action issued in KR10-2012-7016693 issued on Sep. 24, 2013.
Initial Examination Report issued in TW 100101708 on Oct. 17, 2013.
English Language Translation of Initial Examination Report issued in TW 100101708 on Oct. 17, 2013.
English Language Abstract and Translation of JP 2006-230591 published on Sep. 7, 2006.
English Language Abstract and Translation of JP2006-029585 published on Feb. 2, 2006.
U.S. Appl. No. 13/593,206 electronically captured from PAIR on Dec. 20, 2013.
Korean Office Action issued in KR 2012-7030456 on Dec. 26, 2013.
English Language Translation of Korean Office Action issued in KR 2012-7030456 on Dec. 26, 2013.
U.S. Appl. No. 13/593,206 electronically captured from PAIR on Mar. 12, 2014 between Dec. 12, 2014 and Mar. 12, 2014.
Korean Office Action issued in KR 10-2012-7028098 on Dec. 12, 2013.
English Language Translation of Korean Office Action issued in KR 10-2012-7028098 on Dec. 12, 2013.

* cited by examiner

DAMPER, WASHING MACHINE AND WASHING/DRYING MACHINE

CROSS-REFERENCE TO RELATED APPLICATIONS

This application is a Continuation of International Application No. PCT/JP2011/050539 filed on Jan. 14, 2011, which claims the benefit of Japanese Patent Application No. 2010-117311 filed on May 21, 2010, both of which are incorporated herein by reference.

This application is based upon and claims the benefit of priority from the prior Japanese Patent Application No. 2010-117311 filed on May 21, 2010 and International Application No. PCT/JP2011/050539 filed on Jan. 14, 2011, the entire contents of both of which are incorporated herein by reference.

FIELD

Embodiments described herein relate to a damper, a washing machine and a washing/drying machine.

BACKGROUND

There has conventionally been provided a drum type washing machine including a water tub which is elastically supported by suspensions each mounted on a bottom plate of an outer casing. Each suspension includes a damper absorbing vibration of a drum which is located in the water tub, accommodates laundry and is then rotated and therefore vibration of the water tub. As this type of damper, one which is known employs as an operating fluid a magnetic viscous fluid (MR fluid) changing its viscosity according to the intensity of magnetic field.

The damper employing the magnetic viscous fluid includes a cylinder enclosing a bobbin on which a coil is wound and two yokes mounted on both ends of the bobbin respectively. The damper further includes a shaft which is inserted into the cylinder so as to be axially reciprocable relative to the bobbin and the yokes. The magnetic viscous fluid fills a space defined between the shaft and the bobbin and yokes in the cylinder.

In the above-described construction, a seal is provided between the shaft and the yokes to prevent the magnetic viscous fluid from leaking. However, when dimensional precision and assembly precision of components of the bobbin and each yoke are reduced in fixing the yokes to the respective ends of the bobbin, gaps occur between the bobbin and the yokes. There is a possibility that the magnetic viscous fluid may bypass the seal through the gaps thereby to leak within the cylinder. Furthermore, when fixation of the bobbin and the yokes to the cylinder becomes insufficient, there is a possibility of reduction in a vibration damping force and variations in the characteristics.

DETAILED DESCRIPTION

In general, according to one embodiment, a damper includes a cylinder and a bobbin which is housed in the cylinder and on which a coil generating a magnetic field is wound. A plurality of yokes are housed in the cylinder, at least one of the plurality of yokes being disposed at a first axial side of the bobbin, and at least one other of the plurality of yokes being disposed at a second axial side of the bobbin. A magnetic viscous fluid is retained on inner surfaces of the plurality of yokes and an inner surface of the bobbin. A plurality of sealing members are disposed in the cylinder axially outside the plurality of yokes. The sealing members are configured to prevent leakage of the magnetic viscous fluid so that the magnetic viscous fluid is retained. A shaft extends through the yokes, the bobbin, and the sealing members and is configured to be axially reciprocable relative to the yokes, the bobbin and the sealing member such that reciprocation of the shaft does not substantially displace the magnetic viscous fluids. The coil, the bobbin, and the plurality of yokes are fixed together by a resin.

Several embodiments will be described with reference to the accompanying drawings. Identical or similar parts or components will be affixed with the same reference symbols throughout the embodiments and duplicate description of such parts or components will be eliminated.

First Embodiment

Figure 2:
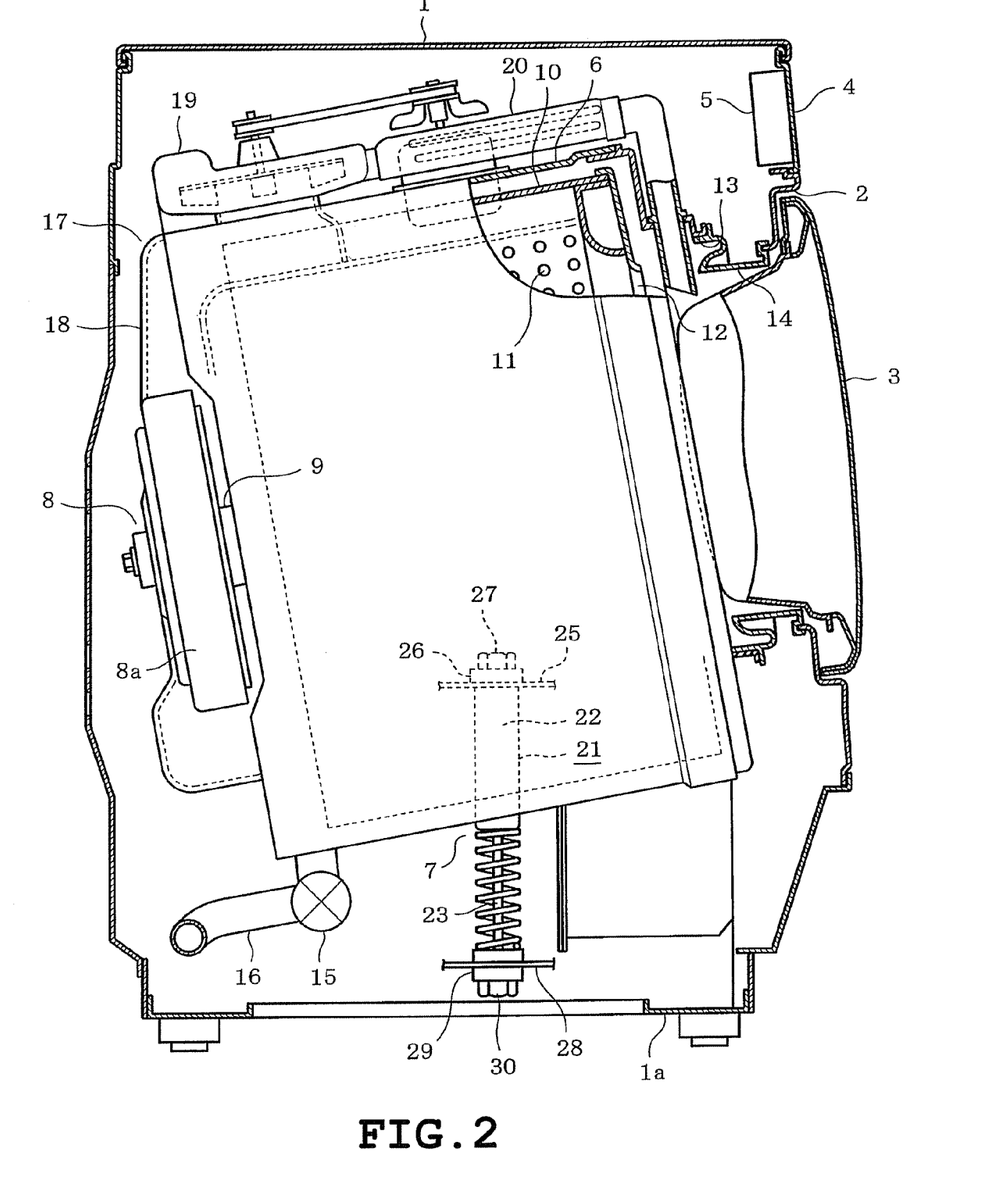
FIG. 2 is a longitudinal section of a drum type washing machine.

A first embodiment will be described. Referring to FIG. 2, an overall structure of a drum type washing machine of the embodiment is shown, and the washing machine includes an outer casing 1 which serves as an outer shell and has a front (located at the right side in FIG. 2) formed with a substantially centrally located access opening 2 and a door 3 opening and closing the access opening 2. An operation panel 4 is mounted on an upper part of the front of the outer casing 1. A control device 15 which controls an operation of the washing machine is provided on a reverse (inside the outer casing 1) of the operation panel 4.

A water tub (tub) 6 is mounted in the outer casing 1. The water tub 6 has an axis directed in a front-back direction (in a right-left direction as viewed in FIG. 2) thereby to be formed into a substantially transverse cylindrical shape and is elastically supported on a bottom plate 1a of the outer casing 1 by a pair of right and left suspensions 7 (only one being shown in FIG. 2) so as to be inclined frontwardly upward. The construction of the suspension 7 will be described in detail later.

An electric motor 8 is mounted on a rear of the water tub 6. The motor 8 is a brushless DC motor in this case, for example, and is of an outer rotor type. The motor 8 includes a rotor 8a having a rotating shaft (not shown) extending through a central part of the rotor 8a. The rotating shaft is inserted through a bearing bracket 9 into an interior of the water tub 6.

A drum 10 is mounted in the water tub 6. The drum 10 also has an axis directed in the front-back direction thereby to be formed into a substantially transverse cylindrical shape. The drum 10 is mounted at the central rear thereof on a distal end of the rotating shaft of the motor 8 thereby to be supported in a frontwardly upwardly inclined state so as to be coaxial with the water tub 6. As a result, the drum 10 is configured to be rotated by the motor 8 thereby to serve as a rotating tub. Thus, the motor 18 functions as a driving device to rotate the drum 10.

The drum 10 has a number of small through holes 11 formed over an entire circumference wall thereof (a torso). The drum 10 and the water tub 6 have fronts formed with openings 12 and 13 respectively. The opening 13 of the water tub 6 communicates with the access opening 2 through annular bellows 14. As a result, the access opening 2 communicates with an interior of the drum 10 through the bellows 14, the opening 13 of the water tub 6 and the opening 12 of the drum 10.

A draining conduit 16 is connected via a drain valve 15 to a rear bottom of the water tub 6. A drying unit 17 is disposed so as to extend from the rear of the water tub 6 to the upper part and the front of the water tub 6. The drying unit 17 includes a dehumidifier 18, a blower (blowing device) 19 and a heater (heating device) 20. The drying unit 17 dehumidifies and heats air in the water tub 6 and returns the air into the water tub 6, whereby air is circulated so that laundry is dried.

Figure 1:
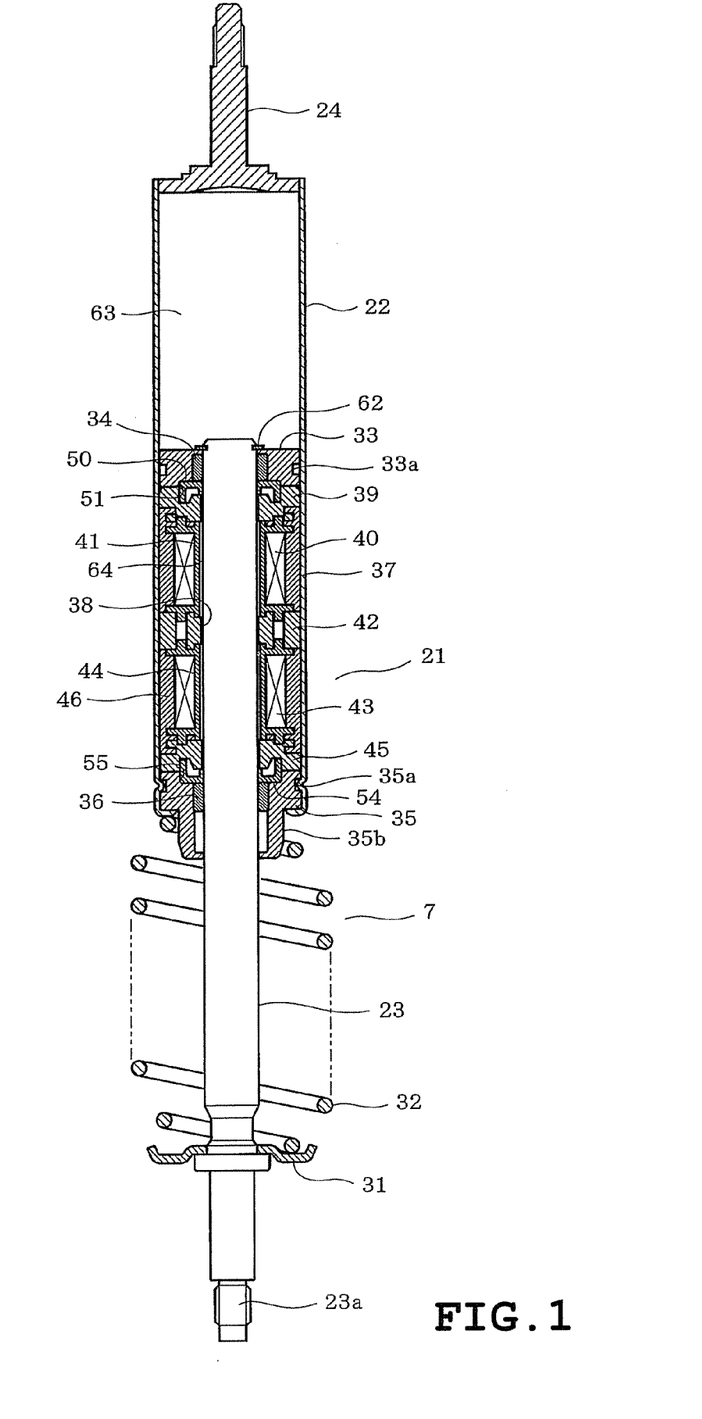
FIG. 1 is a longitudinal section of a suspension of a first embodiment including a damper.

The structure of the suspension 7 will be described in detail. The suspension 7 includes a damper 21 provided with a cylinder 22 (an outer cylinder) and a shaft 23 as primary members. The cylinder 22 has an upper end formed with a connecting member 24 which is inserted through a mounting plate 25 (see FIG. 2) of the water tub 6 upward from below and fastened thereto via an elastic back plate 26 and the like by a nut 37, whereby the cylinder 22 is mounted to the water tub 6.

Meanwhile, the shaft 23 has a lower end formed with a connection 23a which is inserted through a mounting plate 28 of the bottom plate 1a downward from above and fastened thereto via an elastic back plate 29 and the like by a nut 30, whereby the shaft 23 is mounted to the bottom plate 1a of the outer casing 1. The shaft 23 includes a lower part protruding outwardly below the cylinder 22, and a spring seat 31 is fitted with the lower part thereby to be fixed in position, as shown in FIG. 1. A coil spring 32 such as a compression coil spring is mounted between the spring seat 31 and a lower end of the cylinder 22 so as to surround the shaft 23. The spring seat 31 is supported by a flange-like spring receiving portion 23b provided on the shaft 23 thereby to be retained.

An annular upper bracket 33 is housed in a middle interior of the cylinder 22. The upper bracket 33 has a groove 33a formed in an outer periphery thereof. The cylinder 22 has a peripheral wall including a part which corresponds to the groove 33a and is inwardly swaged so that the upper bracket 33 is fixed to the cylinder 22. A bearing 34 is fixed to an inner periphery of the upper bracket 33 to support the shaft 23 so that the shaft 23 is movable upward and downward. The bearing 34 is formed of an oil-impregnated sintered metal, for example.

An annular lower bracket 35 is fixed to an inner lower end of the cylinder 22. The lower bracket 35 has a groove 35a formed in an outer periphery thereof. The peripheral wall of the cylinder 22 has a part which corresponds to the groove 35a and is inwardly swaged so that the lower bracket 35 is fixed to the cylinder 22. A bearing 36 is fixed to an inner periphery of the lower bracket 35 to support the shaft 23 so that the shaft 23 is movable upward and downward. The bearing 36 is formed of an oil-impregnated sintered metal, for example. Additionally, the lower bracket 35 has an underside from which a cylindrical portion 35b protrudes downward through an opening formed in a lower end of the cylinder 22, as shown in FIG. 1.

A coil assembly 37 is housed in a part of the cylinder interior located between the upper and lower brackets 33 and 35. The coil assembly 37 is held between the upper and lower brackets 33 and 35 thereby to be fixed in position. The coil assembly 37 has a through hole 38 through which the shaft 23 extends so as to be movable upward and downward.

Figure 3:
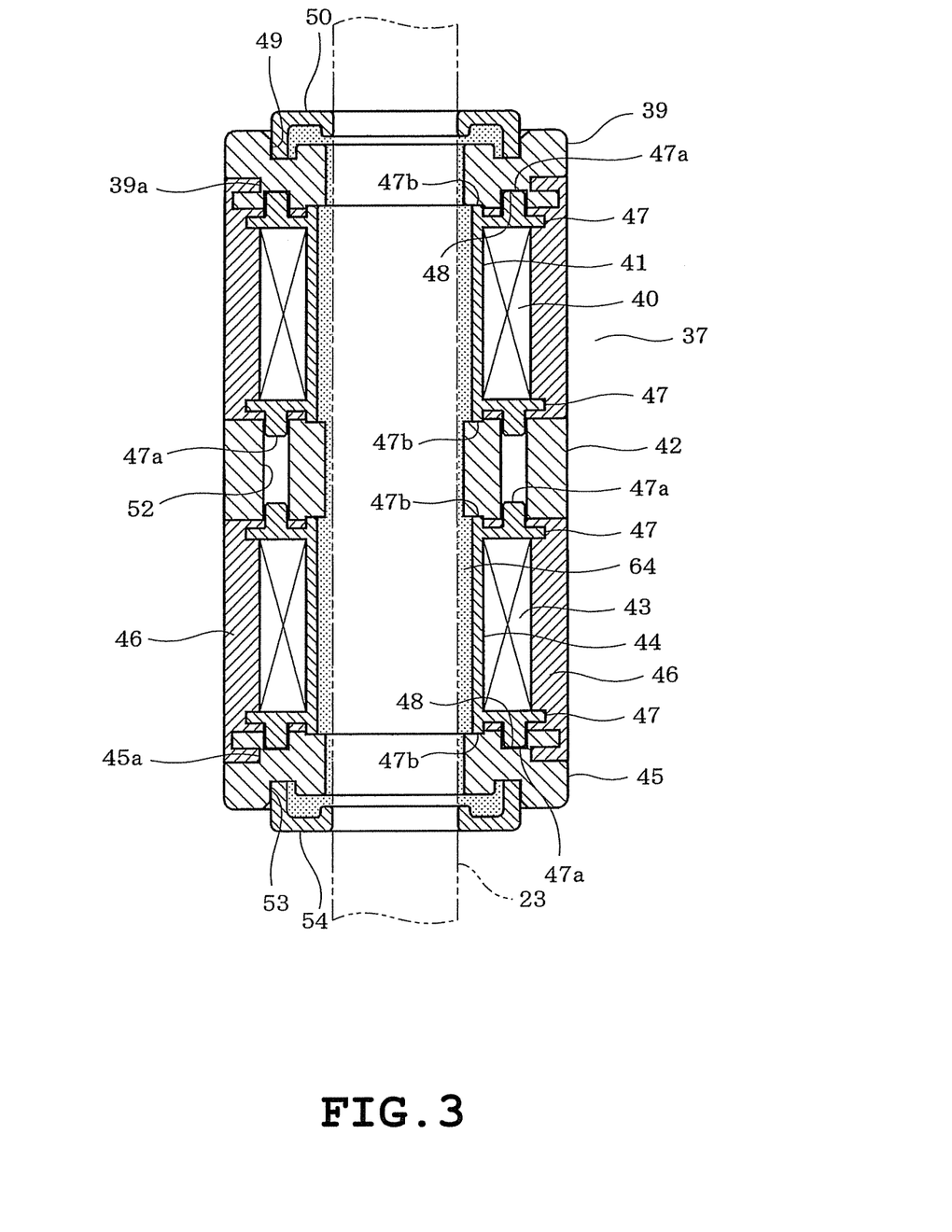
FIG. 3 is a longitudinal section of a coil assembly.

The structure of the coil assembly 37 will be described in detail with reference to FIGS. 3 to 8. The coil assembly 37 includes a first yoke 39, a first bobbin 41 on which a first coil 40 is wound, a second yoke 42, a second bobbin 44 on which a second coil 43 is wound, and a third yoke 45, as shown in FIG. 3. The coils 40 and 43, the bobbins 41 and 44 and the yokes 39, 42 and 45 are covered with a resin 46 by molding (an insert molding) (see FIGS. 3 and 4).

The first bobbin 41 has upper and lower end plates 47 each of which has, for example, four positioning protrusions 47a (engaging portions) protruding outward substantially at regular intervals. Similarly, the second bobbin 44 has upper and lower end plates 47 each of which has, for example, four positioning protrusions 47a (engaging portions) protruding outward substantially at regular intervals.

The first yoke 39 has a lower surface which is located opposite the upper end plate 47 of the first bobbin 41 and formed with recesses 48 (engaged portions) in which the protrusions 47a of the end plate 47 are fitted respectively. The first yoke 39 further has an upper surface formed with an annular recess 49 as viewed in FIG. 3. A sealing member 50 is press-fitted in the recess 49 to be fixed in position. The sealing member 50 includes a protrusion which is configured to be fitted in an annular recess 51 formed in the underside of the upper bracket 33 as viewed in FIG. 1.

Figure 5:
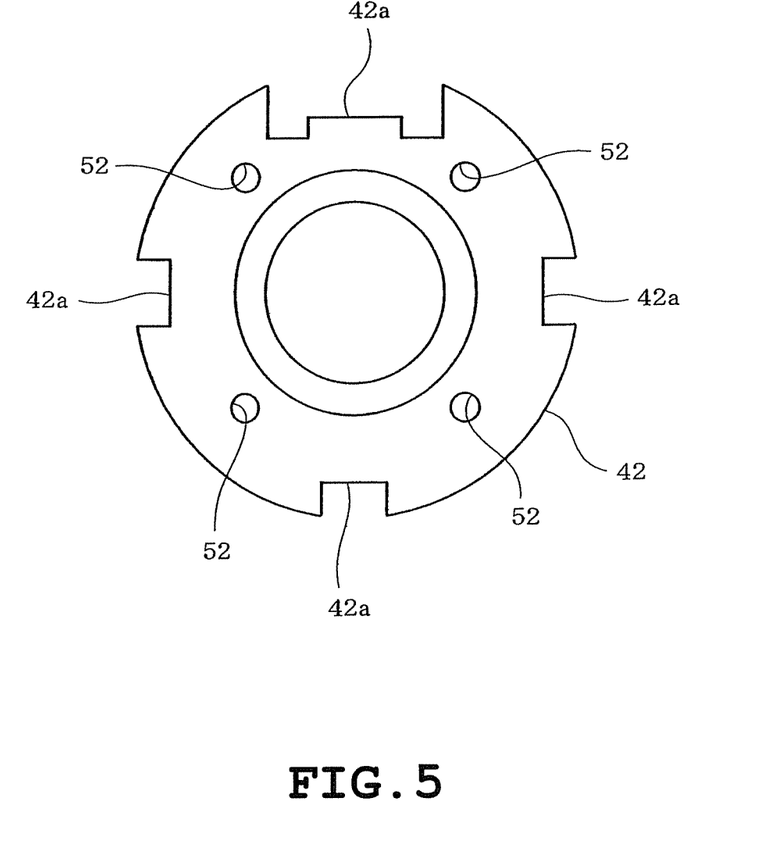
FIG. 5 is a plan view of a second yoke.

The second yoke 42 has four through holes 52 (engaged portions) which are formed so as to be open at the upper and lower surfaces thereof (see FIGS. 3 and 5). The protrusions 47a of the lower end plate 47 of the first bobbin 41 are configured to be fitted into the through holes 52 respectively, and the protrusions 47a of the upper end plate 47 of the second bobbin 44 are also configured to be fitted into the through holes 52 respectively.

The third yoke 45 has an upper surface which is located opposite the lower, end plate 47 of the second bobbin 44 and formed with recesses 48 (engaged portions) in which the protrusions 47a of the lower end plate 47 are fitted respectively. The third yoke 45 further has a lower surface formed with an annular recess 53 as viewed in FIG. 3. A sealing member 54 is press-fitted in the annular recess 49 to be fixed in position. The sealing member 54 includes a protrusion which protrudes from the lower surface of the third yoke 45 and is configured to be fitted in an annular recess 55 formed in the upper side of the lower bracket 35 as viewed in FIG. 1.

In the above-described construction, as shown in FIG. 3, the protrusions 47a of the upper end plate 47 of the bobbin 41 are fitted into the recesses 48 of the first yoke 39, and an annular protrusion 47b protruding from the inner periphery of the upper end plate 47 of the first bobbin 41 is brought into abutment with the lower surface of the first yoke 39. The protrusions 47a of the lower and upper endplates 47 of the first and second bobbins 41 and 44 are fitted into the through holes 52 of the second yoke 42 respectively. The first and second bobbins 41 and 44 have annular protrusions 47a protruding from the inner peripheries of the upper end plates 47 of the bobbins 41 and 44 respectively. The protrusions 47a are brought into abutment with the upper and lower surfaces of the second yoke 42 respectively. Furthermore, protrusions 47a of the lower end plate 47 of the second bobbin 44 are fitted into the recesses 48 of the third yoke 45 respectively. An annular protrusion 47b protruding from an inner periphery of the end plate 47 of the second bobbin 44 is brought into abutment with the upper surface of the third yoke 45.

Subsequently, a round bar (not shown) assuming the position of the shaft 23 and having a diameter corresponding to inner diameters of the yokes is inserted through the yokes 39, 42 and 45 and the bobbins 41 and 44 (the coils 40 and 43) assembled together as described above, so that the components are centered and positioned so that resin can be prevented from proceeding around. In this state, the assembled yokes 39, 42 and 45 and the bobbins 41 and 44 are accommodated in a forming die (not shown) and molding (insert molding) is carried out with the use of a resin 46 so that the assembled yokes 39, 42 and 45 and the bobbins 41 and 44 are covered with the resin 46. As a result, the coils 40 and 43, the bobbins 41 and 44 and the yokes 39, 42 and 45 are fixed together by the resin 46. The round bar is removed after the molding. A thermoplastic resin (nylon, PBT, PET, PP or the like) may be used as the resin 46, for example. The resin 46 covers the outer peripheries of the coils 40 and 43, the bobbins 41 and 44 and the yokes 39, 42 and 45 and further covers a substantially axially lower half of the outer periphery of the first yoke 39 and a substantially axially upper half of the outer periphery of the third yoke 45, as shown in FIG. 3. However, since the resin 46 is prevented from proceeding around by the round bar, the inner surfaces of the yokes are particularly maintained as metal surfaces.

The resin 46 fills a ring-shaped groove 39a defined in the outer periphery of the first yoke 39 and an interspace between the underside of the first yoke 39 and the upper end plate 47 of the first bobbin 41. The resin 46 further fills, for example, four grooves 42a (see FIG. 5) axially formed in the outer periphery of the second yoke 42 at substantially regular intervals, an interspace between the upper side of the second yoke 42 and the lower end plate 47 of the first bobbin 41 and an interspace between the lower surface of the second yoke 42 and the upper end plate 47 of the second bobbin 44. The four grooves 42a of the second yoke 42 include one which is located highest as viewed in FIG. 5 and formed so as to be wider than the other three. The resin 46 further fills a ring-shaped groove 45a formed in the outer periphery of the third yoke 45 and an interspace between the upper surface of the third yoke 45 and the lower end plate of the second bobbin 44. In the above-described configuration, the part molded from the resin 46 has a cylindrical outer periphery and constitutes an inner cylinder.

The following will describe an inner diameter of the through hole 38 (through which the shaft 23 is inserted) of the coil assembly 37 resin-molded in the above-described manner. The three yokes 39, 42 and 45 have the same inner diameter and are formed so that for example, a gap of about 0.4 mm is defined between the outer periphery of the shaft 23 and the inner peripheries of the yokes 39, 42 and 45. The two bobbins 41 and 44 have the same inner diameter, which is slightly larger than the inner diameters of the yokes 39, 42 and 45. The bobbins 41 and 44 are formed so that for example, a gap of about 1.0 mm is defined between the outer periphery of the shaft 23 and the inner peripheries of the bobbins 41 and 44.

Figure 8:
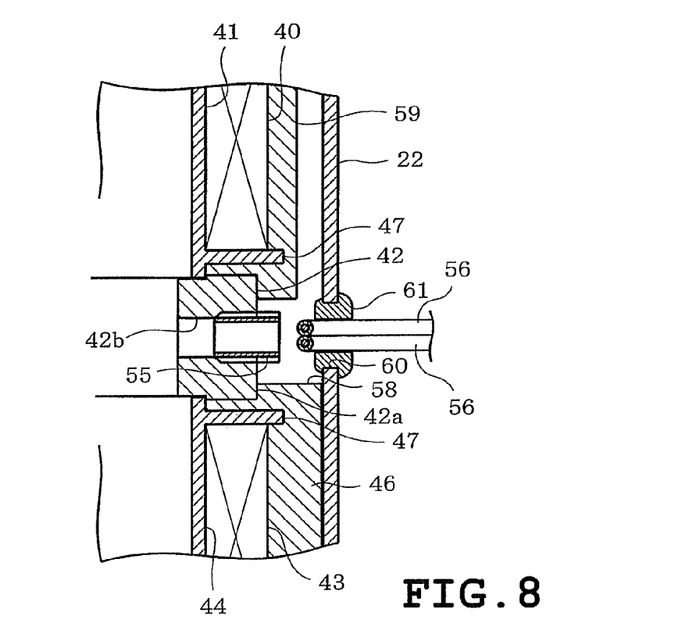
FIG. 8 is also a partial longitudinal section of a part of the coil assembly housed in the cylinder, out of which part the lead wire is drawn.

Furthermore, the groove 42a larger than the other three as shown in FIG. 5 includes a central part formed with a through hole 42b which communicates between the inner and outer peripheries of the second yoke 42 as shown in FIG. 8. A pipe 55 having an outer periphery that is threaded is clamped within the hole 42b to be fixed in position. The pipe 55 is used in order that a magnetic viscous fluid may be injected into the cylinder 22 as will be described later.

Figure 4:
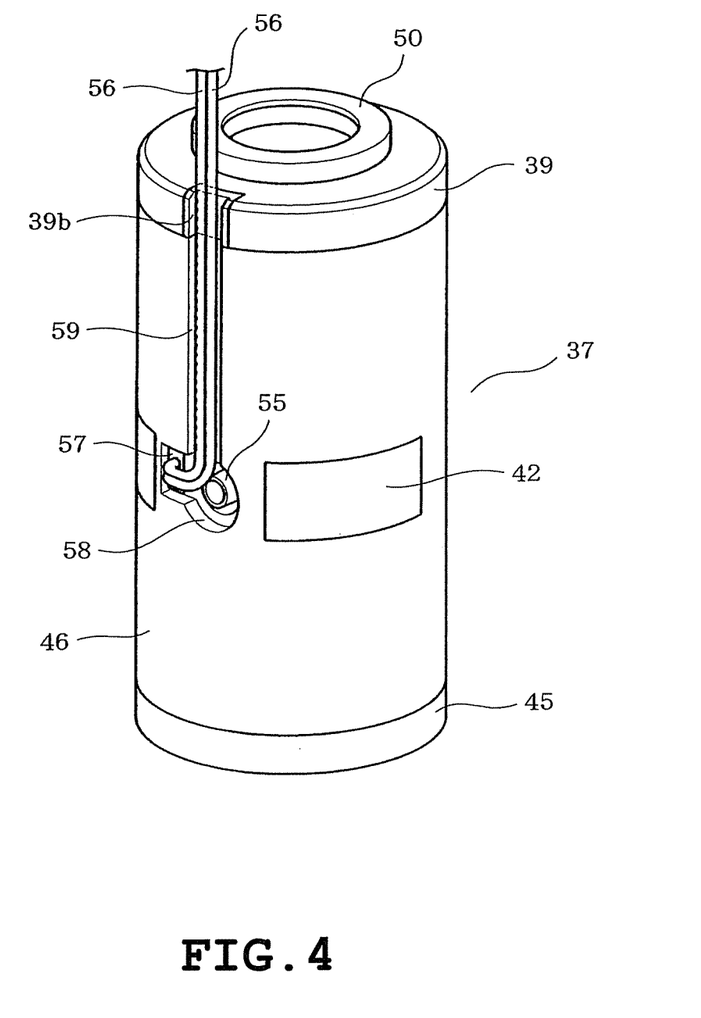
FIG. 4 is a perspective view of the coil assembly.
Figure 7:
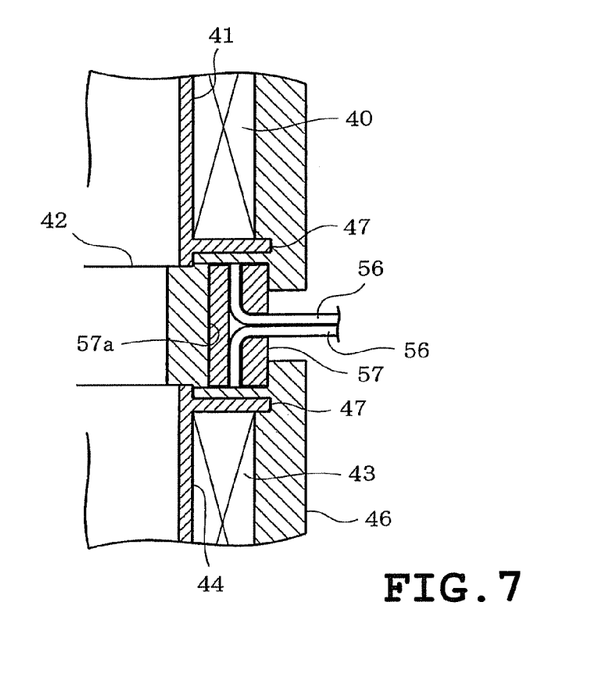
FIG. 7 is a partial longitudinal section of a part of the coil assembly out of which part a lead wire is drawn.

The two coils 40 and 43 are connected in series to each other, and lead wires 56 are connected to both terminals of the serially connected coils 40 and 43 respectively. The lead wires 56 are drawn out of a part of the resin molding corresponding to the upper larger groove 42a of the second yoke 42 as shown in FIG. 4. In this case, a supporting component 57 made of rubber or resin is provided in the aforementioned larger groove 42a to support the lead wires 56 and covered with the resin 46 as shown in FIG. 7. The supporting component 57 is formed with a generally T-shaped support hole 57a, in which the lead wires 56 are accommodated. The support hole 57a is divided into two parts along the support hole 57a in order to accommodate the lead wires 56. The lead wires 56 are drawn from the coils 40 and 43 through guide grooves (not shown) formed in the end plates 47 of the bobbins 41 and 44 into the support hole 57a of the supporting component 57.

The molding of the resin 46 includes a part corresponding to the through hole 42b (the groove 42a) of the second yoke 42 as shown in FIGS. 4 and 8. The part of the molding is formed with a generally circular recess 58. The molding is formed with an accommodating groove 59 which extends upward from the recess 58 and accommodates the lead wires 56. The first yoke 39 includes a part of the outer periphery thereof corresponding to the accommodating groove 59. The part of the first yoke 39 is formed with an accommodating groove 39b which accommodates the lead wires 56.

The following will describe a work for accommodating the coil assembly 37 resin-molded as described above into the cylinder 22. In this case, as shown in FIG. 1, the lower bracket 35 to which the bearing 36 is attached is put into the cylinder 22 from above. The peripheral wall of the cylinder 22 includes a part corresponding to the groove 35a of the lower bracket 35. The part of the peripheral wall of the cylinder 22 is swaged inward so that the lower bracket 35 is fixed in the cylinder 22 (FIG. 1 shows a swaged state).

Figure 6:
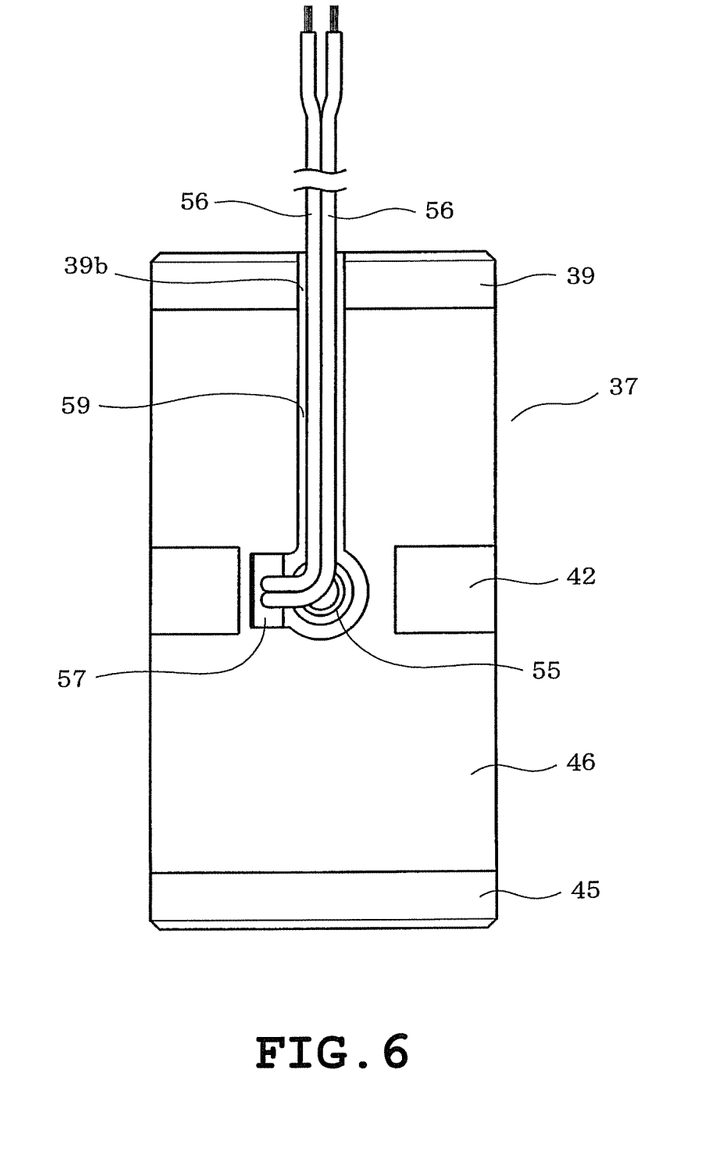
FIG. 6 is a plan view of the coil assembly.

The lead wires 56 drawn out of the resin molding (the supporting component 57) is accommodated in the recess 58, the accommodating grooves 59 and 39b as shown in FIGS. 4 to 6. Thus, the lead wires 56 are treated so as to be prevented from projecting from the outer periphery of the coil assembly 37.

The coil assembly 37 with the lead wires 56 having been treated as described above is housed in the cylinder 22 from above as shown in FIG. 1. In this case, when housed in the cylinder 22, the coil assembly 37 is aligned with the cylinder 22 so that the recess 58 thereof corresponds with a hole 60 (see FIG. 8) formed in the peripheral wall of the cylinder 22. Next, the lead wires 56 are drawn out of the hole 60 of the cylinder 22. Furthermore, the lead wires 56 are passed through a hole formed in a rubber or resin bush 61 and thereafter, the bush 61 is fitted in the hole 60 thereby to be fixed, as shown in FIG. 8. The lead wires 56 drawn out of the bush 61 are adapted to be connected to a control circuit (the control device 5) on-off controlling the coils 40 and 43.

Subsequently, the upper bracket 33 attached with the bearing 34 is housed in the cylinder 22 from above and thereafter, a part of the peripheral wall of the cylinder 22, which part corresponds to the groove 33a of the upper bracket 33, is inwardly swaged so that the upper bracket 33 is fixed in the cylinder 22, as shown in FIG. 1, which shows the state before swaging.

After this, the shaft 23 is inserted into the cylinder 22 from above before the bearing seat 31 is mounted to the shaft 23. The shaft 23 is passed sequentially through the opening of the upper bracket 33, the bearing 34, the sealing member 50, the first yoke 39, the first bobbin 41 (the first coil 40), the second yoke 42, the second bobbin 44 (the second coil 43), the third yoke 45, the sealing member 54, the bearing 36 and the opening of the lower bracket 35, protruding below the cylinder 22.

In this state, the shaft 23 is supported on the bearings 34 and 36 so as to be axially reciprocable relative to the bearing 34, the sealing member 50, the first yoke 39, the first bobbin 41 (the first coil 40), the second yoke 42, the second bobbin 44 (the second coil 43), the third yoke 45, the sealing member 54 and the bearing 36. A retaining ring 62 is attached to the upper end of the shaft 23, and the cylinder 22 includes a part of the interior that is located above the retaining ring 62 and is formed into a hollow interior 63.

The spring seat 31 is fitted with a lower part of the cylinder 22 located below the cylinder 22 thereby to be fixed in position. The coil spring 32 such as a compression coil spring is mounted between the spring seat 31 and the lower end of the cylinder 22 so as to surround the shaft 23.

A magnetic viscous fluid 64 is injected to fill first gaps between the shaft 23 and the bobbins 41 and 44 (the coils 40 and 43) and second gaps between the shaft 23 and the yokes 39, 42 and 45 located in the vicinity of the first gaps (see FIGS. 1 and 3). The sealing members 50 and 54 are provided to prevent the magnetic viscous fluid from leaking from the gaps.

When the magnetic viscous fluid 64 is injected into the gaps, a tube (not shown) is connected to the pipe 55 while the bush 61 as shown in FIG. 8 is detached from the hole 60 formed in the peripheral wall of the cylinder 22, so that air is evacuated from the gaps (vacuuming). Thereafter, the magnetic viscous fluid 64 is injected through the tube into the gaps. After the magnetic viscous fluid 64 has been injected into the gaps, an opening of the pipe 55 is closed by a sealing member or the like and thereafter, the bush 61 is attached to the hole 60 of the cylinder 22.

The suspension 7 constructed as described above is incorporated between the water tub 6 and the bottom plate 1a of the outer casing 1, thereby supporting the water tub 26 on the bottom plate 21a of the outer casing 21 so that the water tub 26 can be prevented from vibration.

In the above-described embodiment, when the coil assembly 37 is configured, the coils 40 and 43, the bobbins 41 and 44 and the yokes 39, 42 and 45 are fixed by the molding with the use of the resin 46. When the yokes 39, 42 and 45 are mounted to the ends of the bobbins 41 and 44 to be fixed, deterioration in the dimensional precision and/or assembly precision of the components of the bobbins 41 and 44 and the yokes 39, 43 and 45 would result in gaps between the components. Even in this case, the gaps between the components can be closed by the molded resin in the above-described embodiment. Consequently, the magnetic viscous fluid 64 can be prevented from leaking from the gaps. Furthermore, the fixation strength of the bobbins 41 and 44 and the yokes 39, 42 and 45 is rendered sufficiently high, with the result that deterioration in the vibration damping force and variations in the characteristics can be prevented.

The thermoplastic resin is used as the resin 46 incorporating the coils 40 and 43, the bobbins 41 and 44 and the yokes 39, 42 and 45 together by the molding in the foregoing embodiment. Consequently, the adhesiveness can be improved and the occurrence of crack can be prevented with the result that the mechanical strength of the damper can be improved. Additionally, when a flame-retarded resin is used as the resin 46, fire spread prevention can be effected in the event of emergency.

Furthermore, the outer peripheries of the yokes 39 and 45 are formed with the grooves 39a and 45a respectively in the foregoing embodiment. The grooves 39a and 45a are filled with the resin 46. Consequently, the adhesive force of the resin 46 can further be improved and the mechanical strength of the resin molding (the coil assembly 37) can further be increased.

Furthermore, when the lead wires 56 connected to the respective coils 40 and 43 are drawn out of the molding of the resin 46, the lead wires 56 are supported by the supporting member made of the resin 46. Consequently, the strength of drawn portions of the lead wires 56 can be improved, whereby the lead wires 56 can sufficiently be protected. Furthermore, the lead wires 56 are protected by the bush 61 which is made of the resin and located at a part of the cylinder 22 through which the lead wires 56 are drawn out of the cylinder 22. Consequently, the lead wires 56 can be prevented from damage thereby to be sufficiently protected.

Furthermore, the protrusions 47a are formed on the upper and lower surfaces of the end plates 47 of the bobbins 41 and 44 respectively. The recesses 48 and the through holes 52 are formed in the lower surface of the yoke 39, the upper and lower surfaces of the yoke 42 and the upper surface of the yoke 45 so as to be engaged with the protrusions 47a respectively. Consequently, the bobbins 41 and 44 and the yokes 39, 42 and 45 can be prevented from rotation and mechanically fixed.

Second Embodiment

Figure 9:
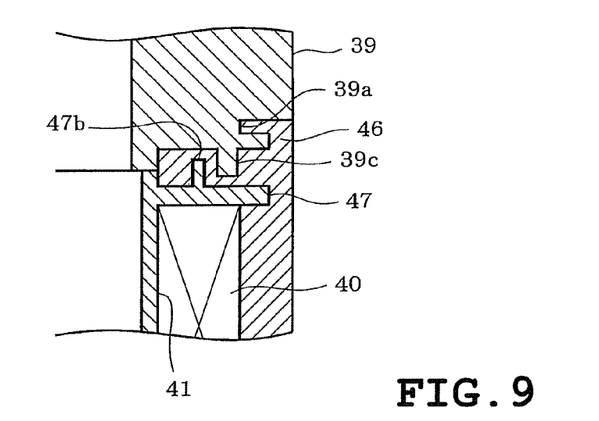
FIG. 9 is a partial longitudinal section of the coil assembly in a second embodiment.

FIG. 9 illustrates a second embodiment. Identical or similar parts in the second embodiment are labeled by the same reference symbols as those in the first embodiment. In the second embodiment, the protrusion 47b and a protrusion 39c are formed on the upper surface of the upper endplate 47 of the first bobbin 41 and the lower surface of the first yoke 39 located opposite the upper surface of the upper end plate 47, so as to be rendered alternate or spaced from each other, whereby a labyrinth structure (a leak preventing portion) is provided.

Similar protrusions are formed on the underside of the lower end plate 47 of the first bobbin 41 and the upper surface of the second yoke 42 located opposite the lower surface of the lower end plate 47, so as to be rendered alternate or spaced from each other, whereby a labyrinth structure is provided. Furthermore, similar protrusions are formed on the upper surface of the upper end plate 47 of the second bobbin 44 and the lower surface of the second yoke 42 located opposite the upper surface of the upper end plate 47, so as to be rendered alternate or spaced from each other, whereby a labyrinth structure is provided. Still furthermore, similar protrusions are formed on the lower surface of the lower end plate 47 of the second bobbin 44 and the upper surface of the third yoke 45 located opposite the lower surface of the lower end plate 47, so as to be rendered alternate or spaced from each other, whereby a labyrinth structure is provided.

The construction of the damper other than described above is similar to that of the first embodiment. Accordingly, the second embodiment can achieve substantially the same advantageous effects as those of the first embodiment. Particularly in the second embodiment, the protrusions 47b and 39c are formed on the upper surfaces and the lower surfaces of the end plates of the bobbins 41 and 44 and the lower surfaces and the upper surfaces of the end plates of the yokes 39, 42 and 45 located opposite the end plates of the bobbins 41 and 44, so as to be rendered alternate or spaced from each other, whereby the labyrinth structures are provided. Consequently, the magnetic viscous fluid can further reliably be prevented from leaking from the joints between the bobbins 41 and 44 and the yokes 39, 42 and 45.

Third Embodiment

Figure 10:
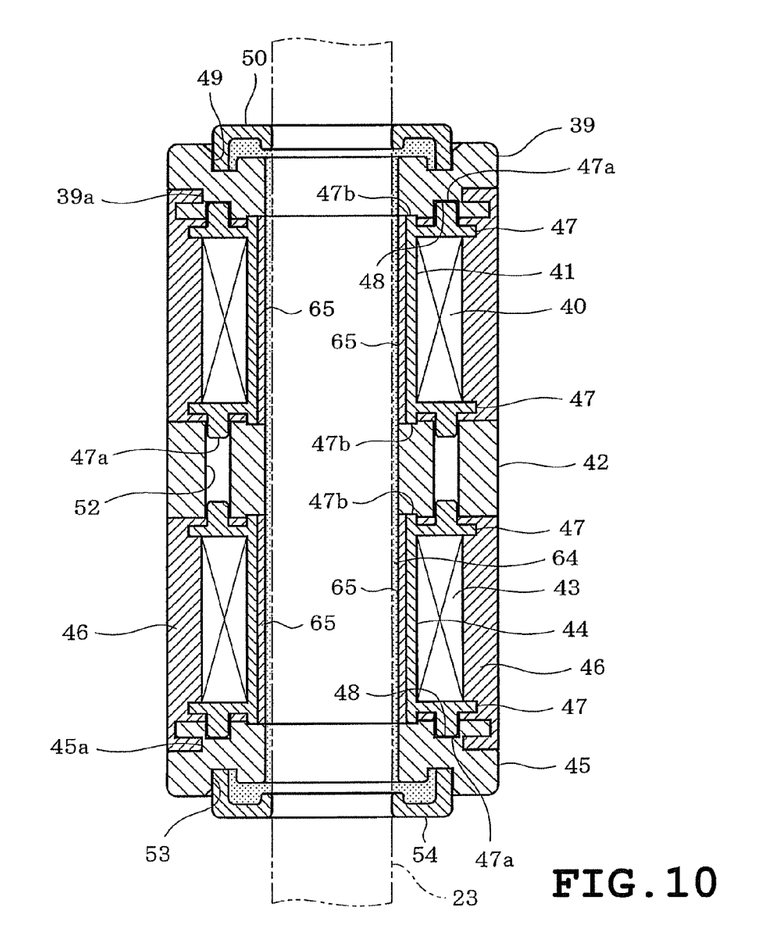
FIG. 10 is a view similar to FIG. 3, showing a third embodiment.

FIG. 10 illustrates a third embodiment. Identical or similar parts in the third embodiment are labeled by the same reference symbols as those in the first embodiment. In the third embodiment, when the coils 40 and 43, the bobbins 41 and 44 and the yokes 39, 42 and 35 are covered with the resin 46 together by the resin molding in the configuration of the coil assembly 37, the round bar of the forming die has an outer diameter according to the inner diameters of the yokes so that the resin 46 proceeds around the inner peripheral surfaces of the bobbins 41 and 44, whereupon a molding surface 65 of the resin 46 is provided. In this case, the molding surface 65 is configured so as to be substantially coplanar with the inner peripheries of the yokes 39, 42 and 45, that is, the molding surface 65 has an inner diameter that is equal to inner diameters of the yokes 39, 42 and 45.

The construction of the damper other than described above is similar to that of the first embodiment. Accordingly, the third embodiment can achieve substantially the same advantageous effects as those of the first embodiment. Particularly in the second embodiment, the molding surface 65 is provided on the inner peripheries of the bobbins 41 and 44 when the coils 40 and 43, the bobbins 41 and 44 and the yokes 39, 42 and 45 are covered with the resin 46 by the resin molding. Consequently, the adhesive force of the resin 46 can further be improved and the mechanical strength of the resin molding (the coil assembly 37) can further be increased.

Although the thermoplastic resin is used as the resin 46 in each foregoing embodiment, a thermosetting resin may be used as the resin 46, instead of the thermoplastic resin. In each embodiment, the protrusions 47a are formed on the end plates 47 of the bobbins 41 and 44 and the recesses 48 and the through hole 52 are formed in the yokes 39, 42 and 45. However, recesses may be formed in the end plates 47 of the bobbins 41 and 44 and protrusions may be formed on the yokes 39, 42 and 45, respectively, instead. Furthermore, the damper 21 may be provided upside down so as to be connected to the outer casing 1 at the cylinder 22 side and to the water tub 6 at the shaft 23 side. When the damper 21 is constructed in this manner, the cylinder 22 side can be avoided from vibration although the shaft 23 side is vibrated with the water tub 6. Since the lead wires 56 is drawn out of the cylinder 22 or the fixed side in this construction, the lead wires 56 can be prevented from being fatigued with vibration of the water tub 6.

According to the third embodiment, the coils 40 and 43, the bobbins 41 and 44 and the yokes 39, 42 and 35 are fixed together by the resin 46. This can prevent the leakage of the magnetic viscous fluid and improve the fixation strength of the coils 40 and 43, the bobbins 41 and 44 and the yokes 39, 42 and 35.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A damper comprising:
   a cylinder;
   a bobbin which is housed in the cylinder and on which a coil generating a magnetic field is wound;
   a plurality of yokes housed in the cylinder, at least one of the plurality of yokes being disposed at a first axial side of the bobbin, and at least one other of the plurality of yokes being disposed at a second axial side of the bobbin;
   a magnetic viscous fluid retained on inner surfaces of the plurality of yokes and an inner surface of the bobbin;
   a plurality of sealing members disposed in the cylinder axially outside the plurality of yokes, the sealing members configured to prevent leakage of the magnetic viscous fluid so that the magnetic viscous fluid is retained; and
   a shaft which extends through the yokes, the bobbin, and the sealing members and configured to be axially reciprocable relative to the yokes, the bobbin, and the sealing members such that reciprocation of the shaft does not substantially displace the magnetic viscous fluid;
   wherein the coil, the bobbin, and the yokes are fixed together by a resin.

2. The damper according to claim 1, wherein the resin is a thermoplastic resin.

3. The damper according to claim 1, wherein the bobbin includes an inner periphery provided with a molding surface molded from the resin.

4. The damper according to claim 1, wherein the bobbin includes an end plate and a leakproof portion provided between the end plate of the bobbin and the yoke located opposite the end plate to prevent the magnetic viscous fluid from leaking.

5. The damper according to claim 4, wherein the leakproof portion includes a labyrinth structure in which a plurality of protrusions is formed on an upper or lower surface of the end plate of the bobbin and on a lower or upper surface of the yoke located opposite the upper or lower surface of the end plate of the bobbin respectively so that the protrusions of the bobbin and the protrusions of the yoke are disposed alternately.

6. The damper according to claim 1, wherein the yoke includes an outer periphery formed with a groove, and the groove is filled with the resin.

7. The damper according to claim 1, wherein the coil includes a terminal to which a lead wire is connected, and the lead wire is supported by a supporting member made of the resin when drawn out of a molding surface molded from the resin.

8. The damper according to claim 7, wherein the cylinder includes a through hole and the lead wire is protected by a protecting component which is made of the resin and provided in the through hole of the cylinder through which the lead wire is drawn out of the cylinder.

9. The damper according to claim 1, wherein the bobbin includes an end plate including an upper or lower surface provided with an engaging portion, and the yoke includes a lower or upper surface located opposite the upper or lower surface of the endplate and provided with an engaged portion which is engaged with the engaging portion.

10. A washing machine which includes an outer casing, a first tub located in the outer casing, a rotating tub located in the first tub and configured to be rotatable, and a suspension elastically supporting the first tub in the outer casing and including a damper which damps vibration of the first tub, the damper comprising:

a cylinder;

a bobbin which is housed in the cylinder and on which a coil generating a magnetic field is wound;

a plurality of yokes housed in the cylinder, at least one of the plurality of yokes being disposed at a first axial side of the bobbin, and at least one other of the plurality of yokes being disposed at a second axial side of the bobbin;

a magnetic viscous fluid retained on inner surfaces of the plurality of yokes and an inner surface of the bobbin;

a plurality of sealing members disposed in the cylinder axially outside the plurality of yokes, the sealing members configured to prevent leakage of the magnetic viscous fluid so that the magnetic viscous fluid is retained; and a shaft which extends through the yokes, the bobbin, and the sealing members and configured to be axially reciprocable relative to the yokes, the bobbin, and the sealing members such that reciprocation of the shaft does not substantially displace the magnetic viscous fluid;

wherein the coil, the bobbin, and the yokes are fixed together by a resin.

11. The washing machine according to claim 10, wherein the bobbin includes an end plate and a leakproof portion provided between the end plate of the bobbin and the yoke located opposite the end plate to prevent the magnetic viscous fluid from leaking.

12. The washing machine according to claim 10, wherein the yoke includes an outer periphery formed with a groove, and the groove is filled with the resin.

13. The washing machine according to claim 10, wherein the coil includes a terminal to which a lead wire is connected, and the lead wire is supported by a supporting member made of the resin when drawn out of a molding surface molded from the resin.

14. The washing machine according to claim 13, wherein the cylinder includes a through hole and the lead wire is protected by a protecting component which is made of the resin and provided in the through hole of the cylinder through which the lead wire is drawn out of the cylinder.

15. The washing machine according to claim 10, wherein the bobbin includes an end plate including an upper or lower surface provided with an engaging portion, and the yoke includes a lower or upper surface located opposite the upper or lower surface of the end plate and provided with an engaged portion which is engaged with the engaging portion.

16. A washing/drying machine which includes an outer casing, a first tub located in the outer casing, a rotating tub located in the first tub and configured to be rotatable, a suspension elastically supporting the first tub in the outer casing and including a damper which damps vibration of the first tub, a heater generating hot air, and a blower supplying hot air into the rotating tub, the damper comprising:

a cylinder;

a bobbin which is housed in the cylinder and on which a coil generating a magnetic field is wound;

a plurality of yokes housed in the cylinder, at least one of the plurality of yokes being disposed at a first axial side of the bobbin, and at least one other of the plurality of yokes being disposed at a second axial side of the bobbin;

a magnetic viscous fluid retained on inner surfaces of the plurality of yokes and an inner surface of the bobbin;

a plurality of sealing members disposed in the cylinder axially outside the plurality of yokes, the sealing members configured to prevent leakage of the magnetic viscous fluid so that the magnetic viscous fluid is retained; and a shaft which extends through the yokes, the bobbin, and the sealing members and configured to be axially reciprocable relative to the yokes, the bobbin, and the sealing members such that reciprocation of the shaft does not substantially displace the magnetic viscous fluid;

wherein the coil, the bobbin, and the yokes are fixed together by a resin.

17. A damper comprising:

an outer cylinder;

an inner cylinder housed in the outer cylinder;

a coil housed in the inner cylinder and configured to generate a magnetic field;

a magnetic viscous fluid filling a gap defined inside the coil in the inner cylinder;

a plurality of sealing members disposed in the inner cylinder axially outside the coil, the sealing members being configured to prevent leakage of the magnetic viscous fluid so that the magnetic viscous fluid is retained; and a shaft which extends through the inner cylinder, the coil, and the sealing members and is configured to be axially reciprocable relative to the inner cylinder, the coil, and the sealing members such that reciprocation of the shaft does not substantially displace the magnetic viscous fluid.

18. The damper according to claim 17, wherein:

the coil includes two coils;

three yokes provided on ends of the coils; and the first yoke, the first coil, the second yoke, the second coil and the third yoke are disposed axially sequentially in the inner cylinder; and the sealing members are located axially outside the first and third yokes respectively.

19. The damper according to claim 17, further comprising:

a spring seat provided on a part of the shaft protruding outside the outer cylinder; and a coil spring provided between the spring seat and an end of the outer cylinder so as to surround the shaft.

20. The damper according to claim 17, further comprising:

a groove formed in an outer periphery of the inner cylinder so as to axially extend along the inner cylinder, the groove accommodating a lead wire drawn out of the coil; and a hole formed through a peripheral wall of the outer cylinder, wherein the lead wire is inserted through the hole.

* * * * *